US011442049B2

(12) United States Patent
Dewalt et al.

(10) Patent No.: US 11,442,049 B2
(45) Date of Patent: Sep. 13, 2022

(54) METHOD FOR PRODUCING A PURPLE COMPLEX FOR THE PRESENCE OF LEAD USING SODIUM RHODIZONATE WITHOUT USE OF STRONG ACID

(71) Applicants: Frederic G Dewalt, Landenberg, PA (US); David C Cox, Chevy Chase, MD (US)

(72) Inventors: Frederic G Dewalt, Landenberg, PA (US); David C Cox, Chevy Chase, MD (US)

( * ) Notice: Subject to any disclaimer, the term of this patent is extended or adjusted under 35 U.S.C. 154(b) by 440 days.

(21) Appl. No.: 16/521,829

(22) Filed: Jul. 25, 2019

(65) Prior Publication Data

US 2021/0025859 A1  Jan. 28, 2021

(51) Int. Cl.
*G01N 31/22* (2006.01)

(52) U.S. Cl.
CPC .................. *G01N 31/22* (2013.01)

(58) Field of Classification Search
CPC .............. G01N 31/22; G01N 21/78
See application file for complete search history.

(56) References Cited

U.S. PATENT DOCUMENTS

| | | | | |
|---|---|---|---|---|
| 5,550,061 A | * | 8/1996 | Stone | G01N 21/78 436/73 |
| 6,489,170 B1 | * | 12/2002 | Cole | G01N 31/22 436/73 |
| 2006/0160230 A1 | * | 7/2006 | Esswein | C11D 3/2075 436/77 |
| 2009/0208051 A1 | * | 8/2009 | Emo | G01N 21/76 382/100 |
| 2011/0177604 A1 | * | 7/2011 | Kayano | G01N 31/22 436/73 |
| 2017/0027482 A1 | * | 2/2017 | Zilberstein | A61B 5/14546 |

OTHER PUBLICATIONS

Houck, Max M., Frank Crispino, and Terry McAdam. The science of crime scenes. Academic Press, 2017. (Year: 2017).*
BCA (Sodium Rhodizonate Test for Lead) https://dps.mn.gov/divisions/bca/bca-divisions/forensic-science/Pages/forensic-programs-crime-scene-rhodizonate.aspx (Year: 2011).*

* cited by examiner

*Primary Examiner* — Jennifer Wecker
*Assistant Examiner* — Oyeleye Alexander Alabi

(57) ABSTRACT

A method using ascorbic acid (Vitamin C) as part of a chemical test kit employing sodium rhodizonate as the coloring agent for producing a yellow-orange to purple color transition for detection of lead in various media eliminating the use of strong acid.

21 Claims, No Drawings

METHOD FOR PRODUCING A PURPLE COMPLEX FOR THE PRESENCE OF LEAD USING SODIUM RHODIZONATE WITHOUT USE OF STRONG ACID

STATEMENT REGARDING FEDERALLY SPONSORED RESEARCH OR DEVELOPMENT

This invention was made with government support under grant MDLTS0003-14 awarded to QuanTech, Inc., by the U.S. Department of Housing and Urban Development, Office of Lead Hazard Control and Healthy Homes. The government has certain rights in the invention.

CROSS-REFERENCE TO RELATED APPLICATIONS

There are no prior applications related to this invention.

REFERENCE TO SEQUENCE LISTING, A TABLE, OR A COMPUTER PROGRAM LISTING COMPACT DISC APPENDIX

Not applicable.

BACKGROUND OF THE INVENTION

The invention relates to a method of converting the scarlet lead-rhodizonate compound generated when reacting sodium rhodizonate with lead cations, to a purple (blue-violet) lead-rhodizonate complex (color change from scarlet-red to purple) that is diagnostic for the presence of lead when using sodium rhodizonate in a chemical test kit for the detection of lead in paint, lead in dust, lead in soil, metallic lead and in and on other media without the use of strong acid such as hydrochloric or nitric acid.

According to a report by the President's Task Force on Environmental Health Risks and Safety Risks to Children, approximately 24 million U.S. dwellings were at risk for lead-based paint hazards in 1999 and the most common source of lead exposure for children today is lead paint in older housing and the contaminated dust and soil it generates ["Eliminating Childhood Lead Poisoning: A Federal Strategy Targeting Lead Paint Hazards," President's Task Force on Environmental Health Risks and Safety Risks to Children (February 2000)]. As far back as the early 1970s, chemical test kits were introduced as relatively nonintrusive, potentially cost saving, qualitative methods for determining the presence or absence of lead-based paint (LBP) while on-site [Vind, H. P. and Drisko, R. W., Field Identification of Weathered Paints, Technical Report TR-766, Naval Civil Engineering Laboratory, Port Hueneme, Calif. (April 1972), 21 pages; Vind, Harold P. and Mathews, C. W., Field Test for Detecting Lead-Based Paint, Technical Note N-1455, Civil Engineering Laboratory, Port Hueneme, Calif. (September 1976), 9 pages].

A (chemical) test using a test kit involves the application of chemical solution to a prepared sample and the subsequent observation of the presence or absence of a characteristic color change [Use of Qualitative Chemical Spot Test Kits for Detection of Lead in Dry Paint Films, Annual Book of ASTM Standards, Standard Practice E 1753, Vol. 04.07, American Society for Testing and Materials, West Conshohocken, Pa. (1998)]. The most commonly used types of test kits for detecting lead in paint, other coatings, and in dust involve either rhodizonate or sulfide ion. Several U.S. patents and patent applications exist for such test kits [U.S. Pat. Nos. 6,800,485, 6,489,170, 5,558,835, 5,550,061, 5,364,792, 5,330,917, 5,278,075, 5,039,618, U.S. Patent Application No. 20110283785, U.S. Patent Application No. 20030203496, and U.S. Patent Application No. 20030049852] and prepackaged kits covering both of these types have been or continue to be commercially available from a number of suppliers, although, the accuracy of some of these kits has been questioned [A Field Test of Lead-Based Paint Testing Technologies: Technical Report," EPA 747-R-95-002b (May 1995), EPA Recognition of Lead Test Kits, available at: http://www2.epa.gov/lead/epa-recognition-lead-test-kits#recognized]. The first type is based on the reaction of rhodizonate ion with lead II ion. At a pH of about 2.8, this reaction produces a color change from yellow-orange to pink, red or scarlet (producing a scarlet lead-rhodizonate compound) with the color intensity depending on the amount of lead present (red intensifies as the amount of lead present gets higher). The other is based on the reaction of sulfide ion, in basic solution with lead II ion; where either solid lead (II) sulfide is created producing a color change to gray or black or a dark colored solution is formed by adding a caustic leach of the sample prior to adding the sulfide ion [U.S. Patent Application No. 20110283785]. Observation of the characteristic color change is a taken as a positive indicator of the presence of lead in the paint sample tested.

Sodium rhodizonate is commonly used in forensic methods for lead bullet and gunshot residues [Chemical tests for range of firing estimations, Bev Fitchett's Guns Magazine; 25 Nov. 2018; and Sodium Rhodizonate Test for Lead; Minnesota BCA; Minnesota Department of Public Safety]. For these applications, and one patent [U.S. Pat. No. 6,800, 485], the methods go a step further and alter the color change from pink, red or scarlet (red) to purple by adding a strong acid (hydrochloric acid). The purple complex, also referred to as a blue-violet complex that is diagnostic for the presence of lead [An Update on the Use of the Sodium Rhodizonate Test for the Detection of Lead Originating from Firearm Discharges, Journal of Forensic Sciences Volume: 41 Issue: 6, 1996, pages: 1046-10511 is easier to read partly because it is darker in color than the red complex, and partly because the transition from yellow-orange to purple occurs over a much shorter range of lead levels than the yellow-orange to pink, red or scarlet (red) transition based on RGB color values [RGB color model; Wikipedia 2019; see https://en.wikipedia.org/wiki/HSL_and_HSV]. These considerations make the purple transition superior and more sensitive (able todetect lower levels of lead). Also, when in solution using the invention, the relatively stable purple color is achieved within a few seconds whereas the pink, red or scarlet color transition fades quickly after the initial color generation making quantitative assessments of lead concentrations difficult. In both cases, the color of the solution originates from the creation of a finely divided precipitate suspended in solution that will, over several hours, ultimately settle out and coat the bottom of the container where the reaction is performed.

Among the two most commonly used types of test kits for detecting lead, rhodizonate is far more desirable than sulfide, which has safety-of-use concerns for testing in occupied housing (for LBP and lead hazards investigations). First, sulfide is toxic (toxic by ingestion and corrosive) while sodium rhodizonate has no known health effects (it is not a dangerous substance or mixture according to the Global Harmonized System [Globally Harmonized System of Classification and Labeling of Chemicals (GHS), United Nations, available at: http://www.unece.org/trans/danger/ publi/ghs/ghs_rev02/02files_e.html). Second, sulfide kits release small amounts of hydrogen sulfide producing a very unpleasant rotten egg smell and using them in occupied dwellings generally requires opening windows regardless of weather conditions. Rhodizonate kits do not generate unpleasant smells. Third, the color transition for the sulfide kit from lighter to darker shades of brown to black (negative to positive) is subtle. Rhodizonate color transitions (for both the pink, red or scarlet red transition and the purple transition) are sharper having larger changes in color darkness per change in lead concentration. Finally, the sulfide test is not specific for Pb as several other metal ions can react with sulfide to produce a false positive response (such as iron, nickel, cobalt, copper, mercury and molybdenum). Rhodizonate is, generally, more Pb-specific with only barium potentially producing a false positive response. Although, it is worth noting that an undesirable purple color change (one not diagnostic for lead) can be generated under certain conditions generally understood as having to do with insufficient control of the pH before addition of sodium rhodizonate. To obtain the lead blue-violet (purple) complex that is diagnostic for the presence of lead, formation of the scarlet lead-rhodizonate compound is required [An Update on the Use of the Sodium Rhodizonate Test for the Detection of Lead Originating from Firearm Discharges, Journal of Forensic Sciences Volume: 41 Issue: 6,1996, pages: 1046-1051]. However, the use of a strong acid to shift the color transition to from pink, red or scarlet (red) to purple (convert the scarlet lead-rhodizonate compound to the blue-violet complex) introduces safety-of-use concerns for test kits based on rhodizonate and an alternate method of obtaining a purple response without the use of strong acid is desirable for in-field use.

BRIEF SUMMARY OF THE INVENTION

The invention embodies the use of ascorbic acid (Vitamin C) as part of a chemical test kit that uses sodium rhodizonate as the coloring agent for producing a yellow-orange to purple color transition for detection of lead in the tested sample. No strong acid is required to convert the scarlet lead-rhodizonate compound to the purple (blue-violet complex) that is diagnostic for the presence of lead.

BRIEF DESCRIPTION OF THE SEVERAL VIEWS OF THE DRAWING

Not applicable.

DETAILED DESCRIPTION OF THE INVENTION

The Vitamin C-rhodizonate test kit invention involves three chemical (liquid) additions to the sample undergoing testing: the first addition, (A), is used to dissolve the lead in the sample to form $Pb^{+2}$ ions; the second addition, (B), is used to buffer the solution; and the third addition, (C), is used to add rhodizonate to the solution and produce the color change. The Vitamin C-rhodizonate test kit invention is divided into a set of dry chemicals and liquids using 6 containers: one for (A); three for (B); and two for (C). The dry chemicals are mixed with liquids just prior to use. This configuration is aimed at providing the maximum shelf-life for the overall kit (estimated at 6-12 months), an important consideration for practical use as an in-field detection tool. The embodiment of the invention described below places the sample into a 3 mL polystyrene test tube and is aimed at producing a final reacted solution of 1.5 mL to be assessed for the characteristic color change and to have enough mixed solutions to conduct up to 50 tests per test kit. Other embodiments of the invention for larger final volumes can be produced by scaling up the quantities and volumes in proportion with larger volumes assessed for color change directly on filter surfaces after pushing the final reacted samples through such filters (necessary because final color darkness of the solution will get lighter with increasing final volume). Additionally, other embodiments include alterative containers and delivery systems to either simplify the amount of handling for in-field use, change the number of tests per kit, or both. Another embodiment is to apply test kit chemicals directly to media or object as is currently done for forensic applications aimed at detection of lead from gunshot residue but omitting the addition of strong acid needed to convert the scarlet lead-rhodizonate compound to the purple (blue-violet complex) that is diagnostic for the presence of lead by using ascorbic acid. The inclusion of ascorbic acid to make this conversion can be accomplished by either infusing the tartaric acid buffer with ascorbic acid or by applying the ascorbic acid after the scarlet lead-rhodizonate compound (intermediate) is formed.

Container (A). Contains 25 mL of a weak acid such as 20% of acetic or citric acid. Add 0.5 mL of this solution to the sample. Leach the lead out of the sample with the aid of an ultrasonic bath.

Container (B1). Contains 25 mL of water. Pour the contents of (B1) into (B2) and shake for 2 minutes. This produces a saturated tartaric acid buffer solution. The (B2) solution cannot be made in advance because it has a tendency to grow visible strings of particulate matter when left on the shelf for more than a couple of weeks.

Container (B2). Contains 0.375 g of tartaric acid and 0.475 g of sodium tartrate monohydrate. Pour the contents of (B2) into (B3) and shake for 2 minutes to produce a saturated tartaric acid buffer with Vitamin C. The (B3) solution cannot be made in advance because the ascorbic acid will chemically decompose (probably through oxidization) and the desired purple color transition will not occur. The (B3) solution is stable for at least 8 hours.

Container (B3). Contains 0.500 g of ascorbic acid. Add 0.5 mL of this solution to the sample just prior to adding (C2).

Container (C1). Contains 25 mL of a 0.5% solution of saturated tartaric acid buffer (7.5 g of tartaric acid plus 9.5 g of sodium tartrate monohydrate diluted to 500 mL total volume). The 0.5% solution of saturated tartaric acid buffer appears to be stable and was not observed to grow visible strings of particulate matter over time. This dilute buffer is needed to stabilize the sodium rhodizonate solution so that it will last at least 8 hours after mixing.

Container (C2). Contains 0.06 g of sodium rhodizonate. This produces a saturated rhodizonate solution. Add 0.5 mL of this solution to the sample after adding (B3) and proceed to assess the color transition.

That which is claimed is:

1. A method of detecting lead in media or on objects using ascorbic acid without any use of any strong acid to convert the scarlet lead-rhodizonate compound to the purple (blue-violet complex) that is diagnostic for the presence of lead when using sodium rhodizonate using the following steps:
   (a) exposing the media or object to an acid to dissolve the lead to form Pb+ ions;
   (b) exposing the media or object to a tartrate buffer fortified with ascorbic acid;

(c) exposing the media or object to rhodizonate, wherein step b must be performed prior to step c); and, (d) monitoring the media or object for a visible color change.

2. The method of claim 1 wherein the color change to purple (blue-violet) is an indicator of the presence of lead.

3. The method of claim 1 wherein the media is paint, dust or soil.

4. The method of claim 1 wherein the object is any surface where the detection of lead is sought.

5. The method of claim 1 wherein
for step b) of claim 1, the media or object is instead exposed to a tartrate buffer, wherein the tartrate buffer is not fortified with ascorbic acid; and wherein during step c) of claim 1, the media or object is subsequently exposed to rhodizonate; and
wherein said media or object is then exposed to ascorbic acid, to produce a visible color change.

6. The method of claim 1 wherein the tartrate buffer fortified with ascorbic acid has an approximate pH of 2.8 in a solution containing about 0.375 g of tartaric acid, about 0.475 g of sodium tartrate monohydrate, and about 0.5 g of ascorbic acid diluted to 25 mL final volume with water.

7. The method of claim 6 wherein the volume of tartrate buffer fortified with ascorbic acid is increased or decreased by holding constant the ratios of the amounts of about 0.375 g of tartaric acid, about 0.475 g of sodium tartrate monohydrate, and about 0.5 g of ascorbic acid to the 25 mL final volume of water.

8. The method of claim 1, wherein the rhodizonate is a solution containing about 0.06 g of sodium rhodizonate diluted to 25 mL final volume with 0.5% saturated tartrate buffer.

9. The method of claim 8 wherein the volume of rhodizonate is increased or decreased by holding constant the ratio of the amount of about 0.06 g of sodium rhodizonate to the 25 mL final volume of 0.5% saturated tartrate buffer.

10. The method of claim 8 wherein the 0.5% saturated tartrate buffer is about 7.5 g of tartaric acid and about 9.5 g of sodium tartrate monohydrate diluted to 500 mL final volume with water.

11. The method of claim 10 wherein the volume of 0.5% saturated tartrate buffer is increased or decreased by holding constant the ratios of the amounts of about 7.5 g of tartaric acid and about 9.5 g of sodium tartrate monohydrate to the 500 mL final volume of water.

12. The method of claim 5 wherein the tartrate buffer has an approximate pH of 2.8 in a solution containing about 0.375 g of tartaric acid, and about 0.475 g of sodium tartrate monohydrate diluted to 25 mL final volume with water.

13. The method of claim 12 wherein the volume of tartrate buffer is increased or decreased by holding constant the ratios of the amounts of about 0.375 g of tartaric acid, and about 0.475 g of sodium tartrate monohydrate to the 25 mL final volume of water.

14. The method of claim 5 wherein the rhodizonate is a solution containing about 0.06 g of sodium rhodizonate diluted to 25 mL final volume with 0.5% saturated tartrate buffer.

15. The method of claim 14 wherein the volume of rhodizonate is increased or decreased by holding constant the ratio of the amount of about 0.06 g of sodium rhodizonate to the 25 mL final volume of 0.5% saturated tartrate buffer.

16. The method of claim 14 wherein the 0.5% saturated tartrate buffer is about 7.5 g of tartaric acid and about 9.5 g of sodium tartrate monohydrate diluted to 500 mL final volume with water.

17. The method of claim 16 wherein the volume of 0.5% saturated tartrate buffer is increased or decreased by holding constant the ratios of the amounts of about 7.5 g of tartaric acid and about 9.5 g of sodium tartrate monohydrate to the 500 mL final volume of water.

18. The method of claim 5 wherein the ascorbic acid is a solution containing about 0.5 g ascorbic acid diluted to 25 mL final volume with water.

19. The method of claim 18 wherein the volume of ascorbic acid is increased or decreased by holding constant the ratios of the amounts of about 0.5 g of ascorbic acid to the 25 mL final volume of water.

20. The method of claim 1, wherein monitoring for a visible color change is conducted on filter media after pushing some or all of the liquid resulting from steps (a), (b) and (c) applied to the media or object being tested through the filter media.

21. The method of claim 5 wherein monitoring for a visible color change is conducted on filter media after pushing some or all of the liquid from steps (a), (b), (c) and (d) applied to the media or object being tested through the filter media.

* * * * *